(12) United States Patent
Spinelli et al.

(10) Patent No.: US 6,590,911 B1
(45) Date of Patent: Jul. 8, 2003

(54) PASSIVELY MODELOCKED HARMONIC-GENERATING LASER

(75) Inventors: Luis A. Spinelli, Sunnyvale, CA (US); Andrea Caprara, Menlo Park, CA (US); Gary Y. Wang, Fremont, CA (US); R. Russel Austin, Half Moon Bay, CA (US)

(73) Assignee: Coherent, Inc., Santa Clara, CA (US)

( * ) Notice: Subject to any disclaimer, the term of this patent is extended or adjusted under 35 U.S.C. 154(b) by 27 days.

(21) Appl. No.: 09/586,096

(22) Filed: Jun. 2, 2000

(51) Int. Cl.[7] .............................. H01S 3/10; H01S 3/098; H01S 3/091

(52) U.S. Cl. .............................. 372/22; 372/18; 372/21; 372/70

(58) Field of Search .............................. 372/21, 22, 70, 372/75, 18

(56) References Cited

U.S. PATENT DOCUMENTS

| | | | | |
|---|---|---|---|---|
| 4,914,658 A | * | 4/1990 | Stankov et al. | 372/18 |
| 5,278,852 A | * | 1/1994 | Wu | 372/22 |
| 5,296,960 A | * | 3/1994 | Ellingson | 359/330 |
| 5,390,211 A | * | 2/1995 | Clark | 372/95 |
| 5,610,759 A | * | 3/1997 | Delacourt et al. | 372/22 |
| 6,021,140 A | * | 2/2000 | Clark | 372/18 |

OTHER PUBLICATIONS

E. Roissé et al., "Intracavity frequency–tripling of actively mode–locked diode–pumped Nd:YAG laser," *Appl. Phys B*, vol. 69, 1999, pp. 89–91.

K.A. Stankov et al., "A New Mode–Locking Technique Using a Nonlinear Mirror," *Optics Communications*, vol. 66, No. 1, Apr. 1, 1988, pp. 41–46.

* cited by examiner

*Primary Examiner*—Paul Ip
*Assistant Examiner*—James Menefee
(74) *Attorney, Agent, or Firm*—Stallman & Pollock LLP (57) ABSTRACT

A laser includes a resonator terminated by first and second mirrors and including a gain medium providing fundamental radiation. A first optically-nonlinear element is located in the resonator. The first optically-nonlinear element is cooperatively arranged with the first mirror to provide passive modelocking of the fundamental radiation by sequentially converting a first portion of the circulating fundamental radiation to second-harmonic radiation and reconverting a first portion of the second-harmonic radiation to fundamental radiation. A second optically-nonlinear element is arranged to convert a second portion of the second-harmonic radiation to either third-harmonic radiation or fourth-harmonic radiation.

20 Claims, 8 Drawing Sheets

PASSIVELY MODELOCKED HARMONIC-GENERATING LASER

TECHNICAL FIELD OF THE INVENTION

The present invention relates to generation of ultraviolet (UV) laser radiation. It relates in particular to generation of ultraviolet laser radiation by generation of the third and fourth harmonics of fundamental laser radiation having a wavelength in the near-infrared (NIR).

DISCUSSION OF BACKGROUND ART

UV laser radiation is used in optical lithography for patterning photoresist for lithographic masking operations. This patterning may be accomplished by exposing photoresist through a mask having transparent regions therein or, in a "direct writing" mode by steering a focussed beam of UV radiation over the photoresist to define the pattern. Generally, the shorter the wavelength of the radiation, the greater is the resolution and accordingly the smaller the feature size. In this direct writing mode, the quality of the beam can be as important as the wavelength of the beam for obtaining highest possible resolution. Accordingly, the beam is preferably provided by a single operating mode of the laser. The radiation of the beam is preferably either continuous wave (CW radiation) or rapidly pulsed radiation delivered at a sufficiently high pulse rate relative to the pulse duration that it has essentially the same effect as CW radiation.

One preferred prior-art approach to generating a high-quality beam of quasi-CW UV radiation is to provide a diode-laser-pumped, passively modelocked laser resonator delivering NIR radiation at a wavelength of about 1064 nanometers (nm) from a solid state-gain medium such as Nd:YAG or Nd:YVO$_4$. The NIR radiation is then converted to ultraviolet radiation by first doubling and then either tripling or quadrupling the frequency of the NIR radiation. This is done using optically-nonlinear crystals located outside of the laser resonator. Passive modelocking of the NIR laser resonator is typically accomplished using a saturable absorber or the like. The passively-modelocked radiation is typically delivered at a frequency of about 250 megahertz (MHz) or greater.

A problem with this prior-art approach is that it is relatively inefficient. By way of example, in order to generate 5.0 Watts (W) average power of 355 nanometer (mn) wavelength radiation by frequency tripling quasi-CW 1064 nm radiation, the 1064 nm radiation must have an average power of about 25 W to 30 W. This would require a pump-light (diode-laser array) power of about 50 W to 60 W. Conversion to 266 nm radiation by frequency quadrupling would be even less efficient. There is clearly a need for a more efficient-source of quasi-CW UV radiation.

SUMMARY OF THE INVENTION

The present invention is directed to providing a modelocked harmonic-generating laser. In a general aspect, the inventive laser comprises a laser resonator terminated by first and second mirrors. A gain-medium is located in the laser-resonator. An optical pump-light source provides pump-light for energizing the gain-medium, thereby causing fundamental radiation having a fundamental frequency to circulate in the laser resonator. A first optically-nonlinear element is located in the laser resonator. The first optically-nonlinear element is cooperatively arranged with the first mirror to provide passive modelocking of the fundamental-frequency radiation by sequentially converting a first portion of the circulating fundamental radiation to second-harmonic radiation and reconverting a first portion of the second-harmonic radiation to fundamental radiation. A second optically-nonlinear element is arranged to convert a second portion of the second-harmonic radiation to either third-harmonic radiation or fourth-harmonic radiation.

In a first particular aspect of the inventive laser, the second optically-nonlinear element is arranged to convert the second portion of the second-harmonic radiation to third-harmonic radiation by mixing it with a second portion of the fundamental radiation. In one preferred embodiment in accordance with this first particular aspect of the inventive laser, the second optically-nonlinear element is located outside of the laser resonator and the second portions of the fundamental and second-harmonic radiation are transmitted out of the laser resonator by the first mirror. Preferably the transmissivity of the first mirror for the fundamental and second-harmonic radiations is arranged such that the power of the transmitted second portions of the fundamental and second-harmonic radiation is about equal. In another preferred embodiment, the second optically-nonlinear element is located inside the laser resonator between the first mirror and the first optically-nonlinear element.

In a second particular aspect of the inventive laser the second optically nonlinear element is arranged to convert the second portion of the second-harmonic radiation to fourth-harmonic radiation. In one preferred embodiment in accordance with this second particular aspect of the inventive laser, the second optically-nonlinear element is located outside of the laser resonator and the second portion of the second-harmonic radiation is transmitted out of the laser resonator by the first mirror. In another preferred embodiment in accordance with this second particular aspect of the inventive laser, the second optically-nonlinear element is located inside the laser resonator between the first mirror and the first optically-nonlinear element.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
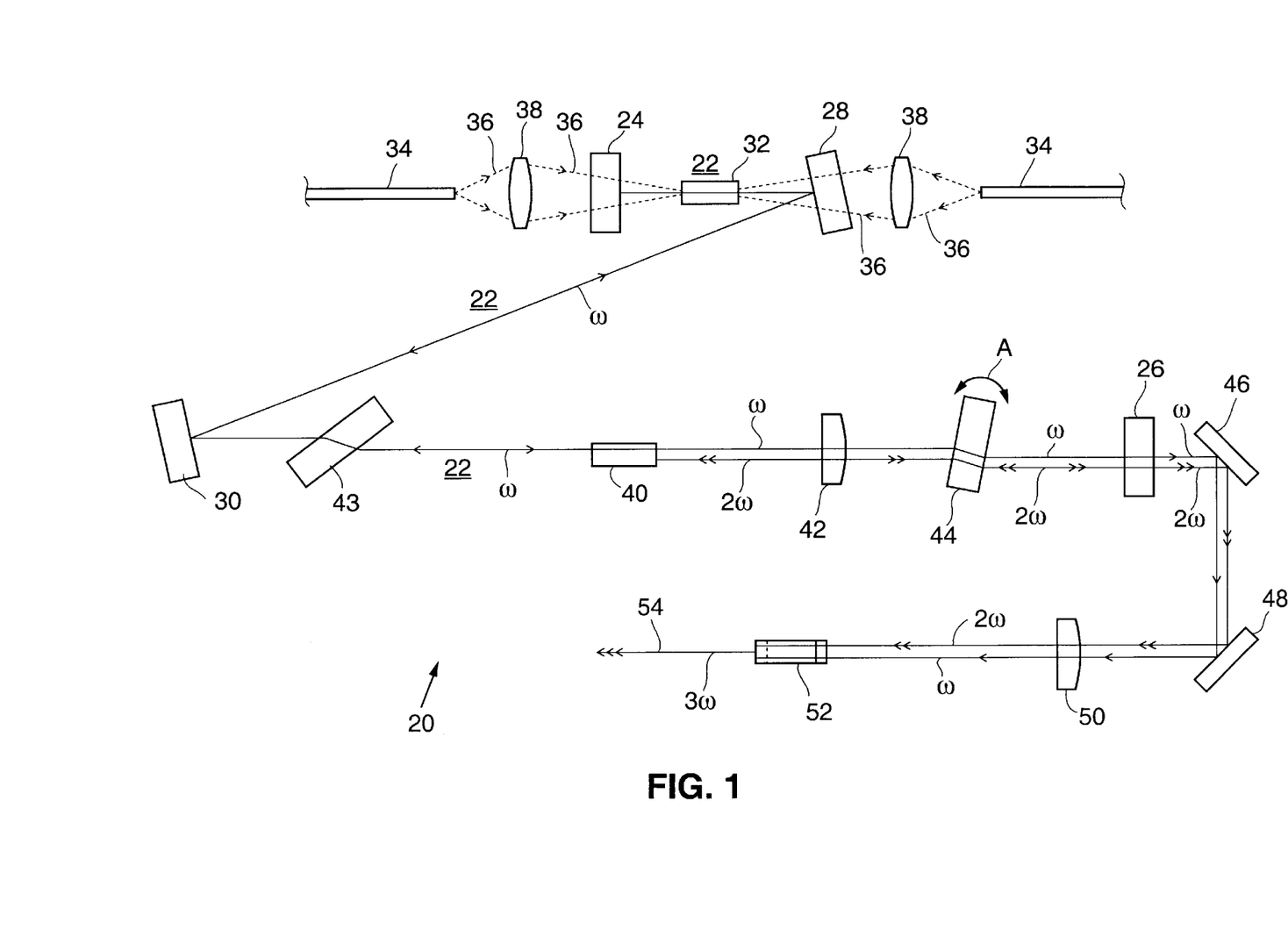
FIG. 1 schematically illustrates one preferred embodiment of a laser in accordance with the present invention having a resonator including a solid-state gain-medium for generating fundamental radiation and a first optically nonlinear crystal arranged to generate the second harmonic of the fundamental radiation, and, in combination with an output coupling mirror of the resonator to provide passively modelocked operation of the laser, the laser having a second optically nonlinear crystal located outside the resonator and arranged to generate third-harmonic radiation from the fundamental and second-harmonic radiation.

Turning now to the drawings, wherein like features are designated by like reference numerals, FIG. 1 shows one preferred embodiment 20 of a passively modelocked frequency multiplied laser in accordance with the present invention. Laser 20 includes a laser resonator 22 formed between mirrors 24 and 26. Laser resonator 22 is folded once by a plane mirror 28 and again by a concave mirror 30.

Resonator 22 includes a rod or crystal of a solid-state gain-medium 32. The gain-medium in examples described herein is preferably Nd:YVO$_4$ which provides fundamental laser radiation at a wavelength of about 1064 nm. This fundamental radiation is referred to alternatively herein as near infrared NIR) laser radiation and is designated in FIG. 1 and other drawings by the Greek symbol $\omega$, which represents its frequency. Those skilled in the art will recognize from this description that the gain-medium can be any solid state gain-medium including for example, Nd:YAG and Nd:YVO$_4$.

Rod 32 is optically pumped. The radiation is generated by diode-laser arrays (not shown) and delivered by optical fibers 34. For a Nd:YVO$_4$ gain-medium the pump-light (pump-radiation) preferably has a wavelength of about 808 nm. Radiation 36 exiting the optical fibers is focussed by lenses 38 into each end of rod 32. The use of optical fibers for delivering pump-light should not be considered as limiting then present invention. Mirrors 24 and 28 are each maximally reflective at 1064 nm and maximally transmissive at 808 nm. Mirror 30 is preferably maximally-reflective at 1064 nm. The term maximally-reflective as used herein means having a reflectivity of about 99% or greater Resonator 22 also includes an optically-nonlinear crystal 40, which, in embodiments and examples of the present invention described herein, is preferably a crystal of lithium triborate (LBO), arranged for type-I frequency doubling of fundamental radiation $\omega$ to second-harmonic radiation. The use of other optically-nonlinear materials such as potassium titanyl phosphate (KTP) beta barium borate (BBO) or the like, with appropriate frequency-doubling schemes, is not precluded.

Second-harmonic radiation is designated in FIG. 1 and other drawings by the term $2\omega$, i.e., twice the fundamental frequency, as well as by double arrows. A lens 42 and located in resonator 22, together with mirror 30 focuses radiation into optically-nonlinear crystal 40 for optimizing conversion of fundamental radiation to second-harmonic radiation. A Brewster plate 43 is provided in resonator 22 to compensate for astigmatism introduced by concave fold mirror 30.

Mirror 26 is partially reflective at both the fundamental wavelength 1064 nm and the second harmonic wavelength 532 nm. The selection of reflection values is particularly important in the operation of laser 20 and is discussed in detail further hereinbelow. A refractive plate 44 together with the physical separation of optically-nonlinear crystal is arranged to provide a specific phase relationship between the fundamental and second harmonic radiations and as they enter optically-nonlinear crystal 40 after reflection from mirror 26. The phase relationship can be precisely adjusted by tilting plate 44 as indicated by arrows A.

The specific phase relationship is one which causes a maximum proportion of second-harmonic radiation $2\omega$ to be reconverted in optically-nonlinear crystal 40 to fundamental radiation $\omega$. The phase relationship is on the order of $\pi/2$, single pass, and can be determined simply, experimentally moving optically-nonlinear crystal 40 or tilting plate 44 until the desired condition is observed. As far as fundamental radiation $\omega$ is concerned, the combination of mirror 26 and optically-nonlinear crystal 40 serves as a nonlinear mirror which provides passive modelocking by a modelocking mechanism described in detail further hereinbelow.

Fundamental radiation $\omega$ and second-harmonic radiation $2\omega$ are extracted from resonator 22 via mirror 26 and directed by mirrors 46 and 48 to a lens 50. Lens 50 focuses the fundamental and second-harmonic radiation into an optically-nonlinear crystal wherein they are converted to a beam 54 of third-harmonic radiation $3\omega$ having a wavelength, in this example, of 355 nm.

Those skilled in the art will recognize that beam 54 may require some optical reshaping using an anamorphic optical system of some kind before being used in a particular application. As such anamorphic beam shaping systems are well- known in the art, a detailed description of such a system is not presented herein.

Continuing with reference to FIG. 1, laser radiation is initiated in resonator 22 by random noise, wherein there are one or more, energy peaks of radiation $\omega$ having very short duration (on the order of nanoseconds). Such a peak is converted by optically-nonlinear crystal 40 into a corresponding peak of radiation 2ω, which is then reconverted to a peak of radiation ω in the optically nonlinear crystal. Accordingly, a pulse of fundamental radiation ω is caused to circulate in resonator 32.

The second-harmonic conversion efficiency in optically-nonlinear crystal 40 for the short duration peaks is greater than for the continuous-wave (CW) energy. Because of this, the combination of mirror 26 and optically-nonlinear crystal 40 behaves as an efficient reflector for the circulating pulses while introducing significant loss for CW radiation, thereby preventing CW operation of resonator 22. A result of is that the resonator is passively modelocked and generates very short pulses of fundamental radiation ω (and second harmonic radiation 2ω between mirror 26 and optically-nonlinear crystal 40) at a pulse-repetition rate in excess of 300 MHz.

The above-described passive modelocking mechanism using a second-harmonic generating crystal in a resonator is described by Stankov et al. in U.S. Pat. No. 4,914,658. The mechanism described in the contex providing a passively modelocked laser primarily for delivering fundamental radiation Stankov et al. teaches that the reflectivity for second-harmonic radiation of the mirror used in combination with the second-harmonic generating crystal should be as high as possible, while being partially reflective for fundamental radiation in order to act as an output coupling mirror through which fundamental radiation is delivered from resonator.

A significant challenge in arriving at modelocked third and higher harmonic-generating lasers in accordance with the present invention was to determine whether or not it is possible to extract sufficient second-harmonic radiation and fundamental radiation from such a passively modelocked resonator to generate useful third-harmonic power. Useful, here, is defined as about 1.0, Watts (W) or greater. Put, another way, it was necessary to determine whether this fundamental and second power could be extracted while still maintaining the passive modelocking property of the combination of optically-nonlinear crystal 40 and mirror 26. A further challenge was presented by a preference that the extracted fundamental and second-harmonic powers be about equal, for optimizing overall conversion efficiency of the inventive laser.

Figure 2:
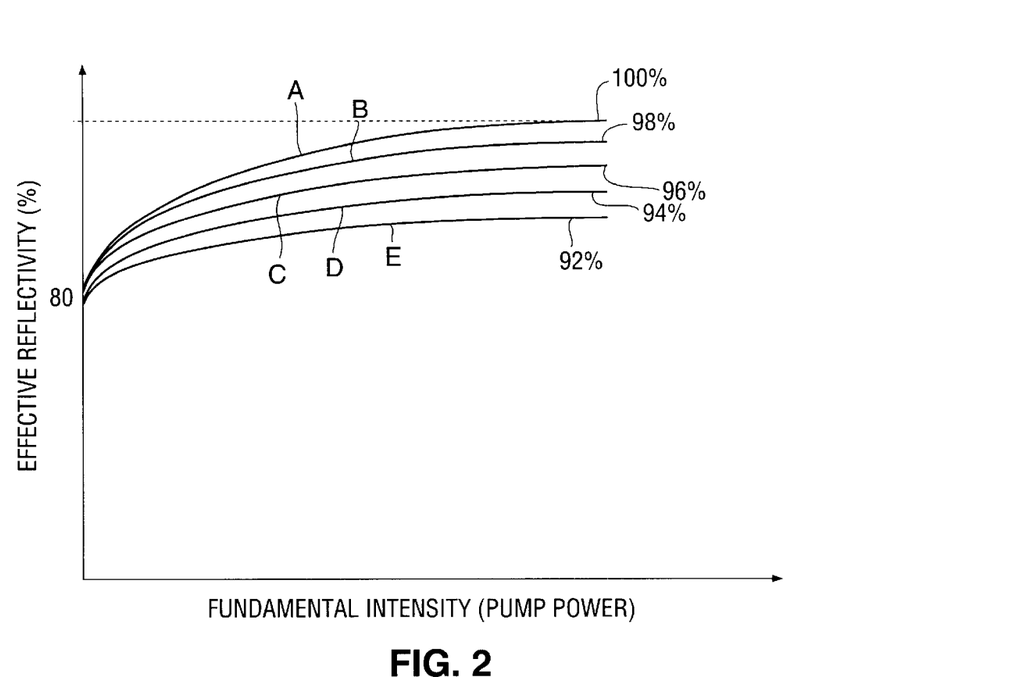
FIG. 2 is a graph schematically illustrating effective reflection of the combination of the output coupling mirror and the optically-nonlinear crystal of FIG. 1 as a function of intensity of the fundamental radiation and second-harmonic reflectivity of the output coupling mirror.

In FIG. 2, curves A, B, C, D, and E graphically depict the effective reflectivity for the combination of mirror 26 and optically-nonlinear crystal 40 as a function of the intensity of 1064 nm radiation when mirror 26 has 532 nm reflectivity of, 100, 98, 96, 94 and 92 respectively and a 1064 nm reflectivity of 80%. Passive modelocking caused by the combination of mirror 26 and optically-nonlinear crystal 40 is preserved provided the effective reflectivity rises as a function of fundamental (1064 nm) intensity.

It can be seen that even when 532 nm reflectivity of mirror 26 is reduced to as low as 92%, the effective reflectivity continues to rise with increasing pump power so that mode locking will still be preserved. A numerical evaluation indicates that in a resonator in accordance with resonator 20 of FIG. 1 wherein mirror 24 is maximally-reflecting at both 1064 nm and 532 nm, and mirror 26 has 1064 nm and 532 nm reflectivities of respectively 80% and 92%, several-watts of 1064 nm radiation and 532 nm radiation can be extracted, with the extracted power in the two wavelengths being about equal. Those skilled in the art will recognize here that reflectivity properties are bestowed on mirror 26 (and other wavelength selective optical components described herein) by the application of multilayer optical interference coatings, wherein in the wavelength regions where reflectivity is specified, at least for wavelengths of about 355 nm or longer, the transmission can be expected to be about equal to 100% minus the reflectivity.

Referring again to FIG. 1 in a resonator configuration used for the evaluation, mirrors 24, 26 and 28 were assumed to be flat mirrors. Concave mirror was assumed to have a radius of curvature of 125.0 mm. Lens 42 was assumed to be a plano-convex lens having an effective focal length of 100 mm. Rod (gain-medium) 32 was assumed to be a YVO$_4$ crystal 3.0 mm×3.0 mm in cross-section and 9.0 mm in length. Total 808 nm pump-light power delivered to rod 32 was assumed to be about 35.0 W. Optically-nonlinear crystal 40 was assumed to be an LBO crystal having a cross-section of 3.0 mm×3.0 mm and a length of about 12.0 nm. The crystal, is arranged such that light propagates along the X-axis. The 1064 nm polarization is along the Z-axis an the generated 532 nm radiation is polarized along the Y-axis. In this resonator configuration, fundamental mode-diameter in optically-nonlinear crystal 40 is about 100 micrometers ($\mu$m). Mirror 26 is assumed to have fundamental and second-harmonic reflectivity of 80% and 92% respectively. The numerical evaluation indicates that about 7.0 W of 1064 nm radiation and 7.5 W of 532 nm radiation would be delivered from resonator 20 via mirror 26. Preferably, the output power of both the fundamental (ω) and doubled radiation (2ω) exiting the resonator should be essentially equal (i.e., within. 15 percent of each other).

Optically-nonlinear crystal 52 was assumed to be an LBO crystal having a cross-section of 3.0 mm×3.0 mm and a length of about 15.0 mm. Light propagates in the Y-Z plane. 1064 nm radiation is polarized along the X-axis and UV (355 nm) radiation is generated with polarization parallel to the X axis. Lens 50 was assumed to be a plano-convex lens having an effective focal length of 45.0 mm and focuses the extracted fundamental and second harmonic radiation to a spot-size of about 50.0 $\mu$m in optically nonlinear crystal 52. The numerical evaluation indicates that about 5.0 W of 355 nm (third-harmonic) radiation would be generated by the crystal.

Figure 3:
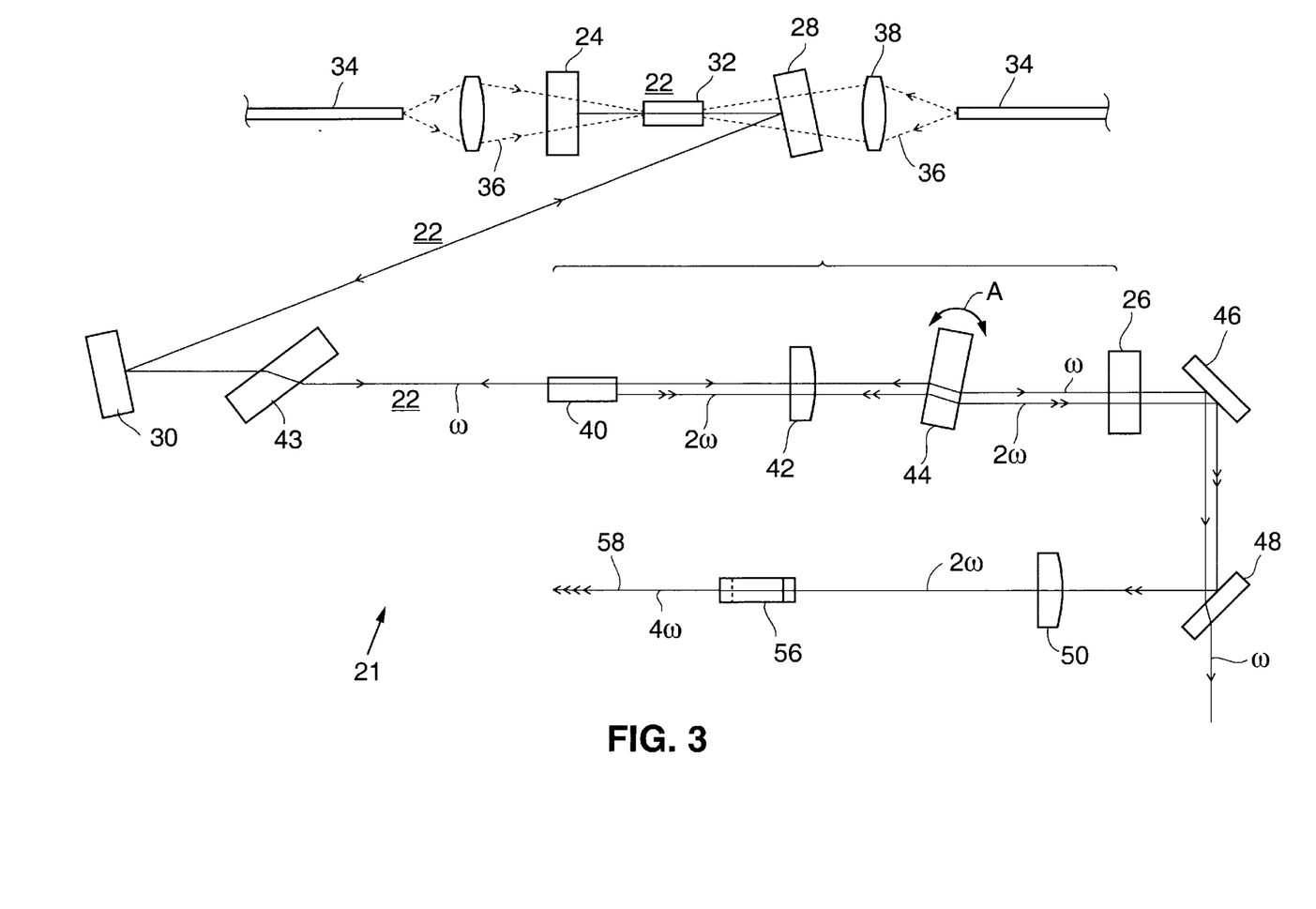
FIG. 3 schematically illustrates another preferred embodiment of a laser in accordance with the present invention similar to the laser of FIG. 1, but wherein the second optically nonlinear crystal located outside the resonator is arranged to generate fourth-harmonic radiation from the second-harmonic radiation.

Referring now to FIG. 3, yet another embodiment 21 of a passively modelocked harmonic generating laser in accordance with the present invention is schematically depicted. Laser 21 is similar to above described laser 20, with the exception that it is configured to generate fourth-harmonic radiation having a frequency 4ω by doubling the frequency of extracted second harmonic radiation 2ω. Fold mirror 48 is transmissive for fundamental radiation ω and highly reflective for second harmonic radiation 2ω. The second-harmonic radiation is focused by lens 50 into an optically nonlinear crystal 56 arranged to double the frequency of the second-harmonic radiation. Optically nonlinear crystal 56 delivers fourth-harmonic radiation having a frequency 4ω.

Numerical evaluation indicates that for a (BBO) beta barium borate crystal 3.0 mm×3.0 mm in cross section and 10.0 mm long, about 2.0 W of 266 nm radiation would be generated from 7.5 W of 532 nm radiation delivered from the above described example of resonator 22.

Figure 4:
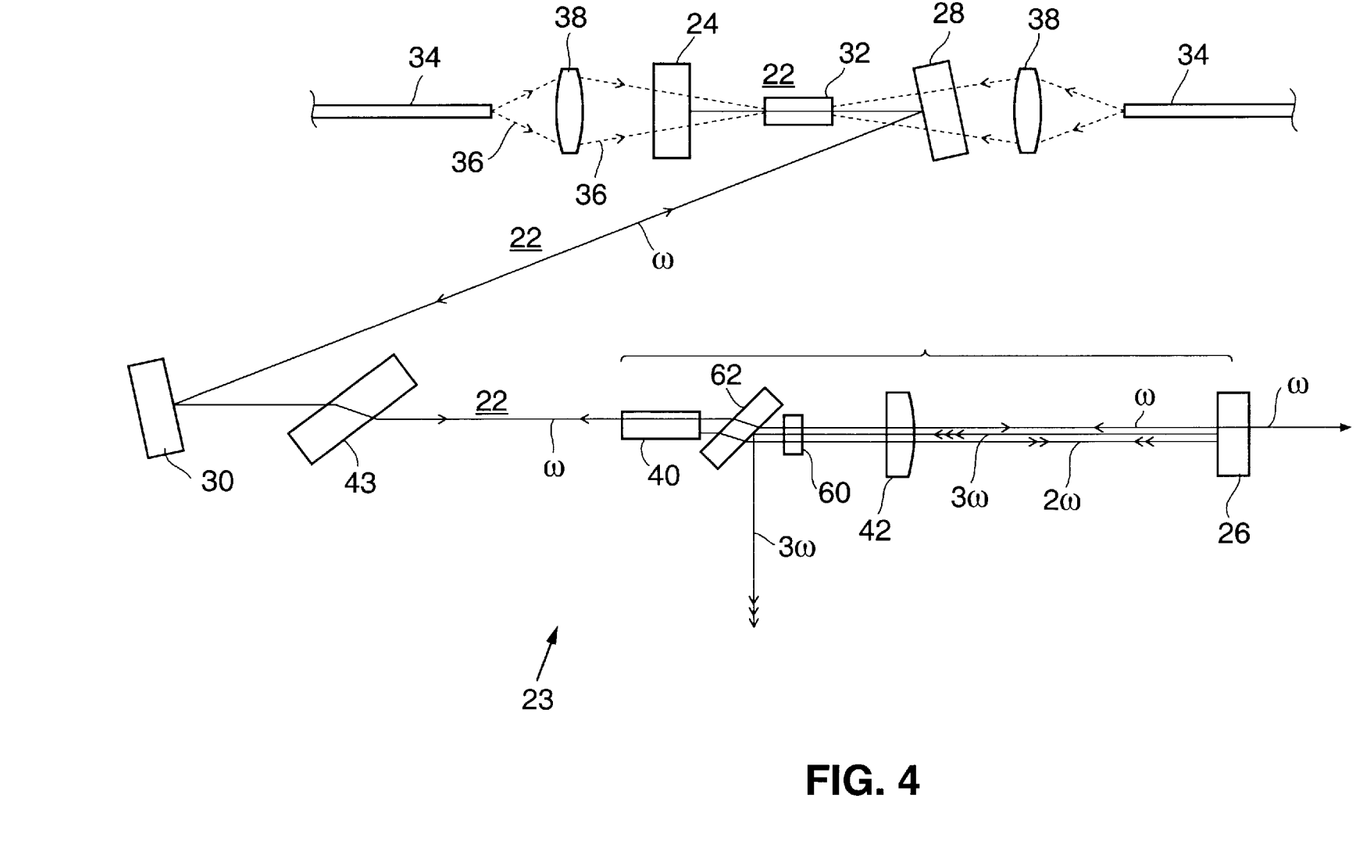
FIG. 4 schematically illustrates yet another preferred embodiment of a laser in accordance with the present invention having a resonator including a solid-state gain-medium for generating fundamental radiation and a first optically non-linear crystal arranged to generate the second harmonic of the fundamental radiation and in combination with an output coupling mirror of the resonator to provide passively modelocked operation of the mirror, the laser having a second optically nonlinear crystal located within the resonator and arranged to generate third-harmonic radiation from the fundamental and second-harmonic radiation.

Lasers in accordance with the present invention are described above in terms of extra-resonator (extra-cavity) generation of third and fourth harmonic radiation. Referring now to FIG. 4, yet another embodiment 23 of a laser in accordance with the present invention arranged for intra cavity generation of third-harmonic radiation is schematically depicted. Laser 23 includes a resonator 22 as in lasers 20 and 21. In laser 23, however, an optically-nonlinear crystal 60 is located between optically-nonlinear crystal 40 and mirror 26 and arranged to generate third-harmonic radiation having a frequency 3ω from fundamental and second-harmonic radiation. A dichroic mirror 62, which is transparent to fundamental and second-harmonic radiation and reflective for third-harmonic radiation directs third-harmonic radiation 3ω out of resonator 22.

Inclusion of optically-nonlinear crystal 60 in resonator 22 also can be used to provide the phase-relationship between fundamental and second-harmonic radiation in optically nonlinear crystal 40 which is necessary to provide passive-modelocking. In this case there would be no requirement for a separate phase control device such as refractive plate 44 of laser 20.

In considering the possibility of intracavity third-harmonic generation by deploying a third-harmonic generating crystal between optically-nonlinear crystal 40 (second-harmonic generating crystal) and mirror 26 it was necessary to determine whether this could be done while still preserving the passive modelocking property of the combination of the mirror and the second-harmonic generating crystal. A result of this investigation is shown graphically in FIG. 5. Here curve F schematically illustrates effective reflectivity of the combination of mirror 26 and optically-nonlinear crystal 40 for fundamental radiation ω as a function of the intensity of the fundamental radiation. A reflectivity of 80% at 1064 nm and a reflectivity of greater than 99% at 532 nm is assumed for mirror 26. The effective reflectivity reaches a peak at about 95%, which results in about 5% of circulating fundamental radiation being coupled out of resonator 22.

Figure 5:
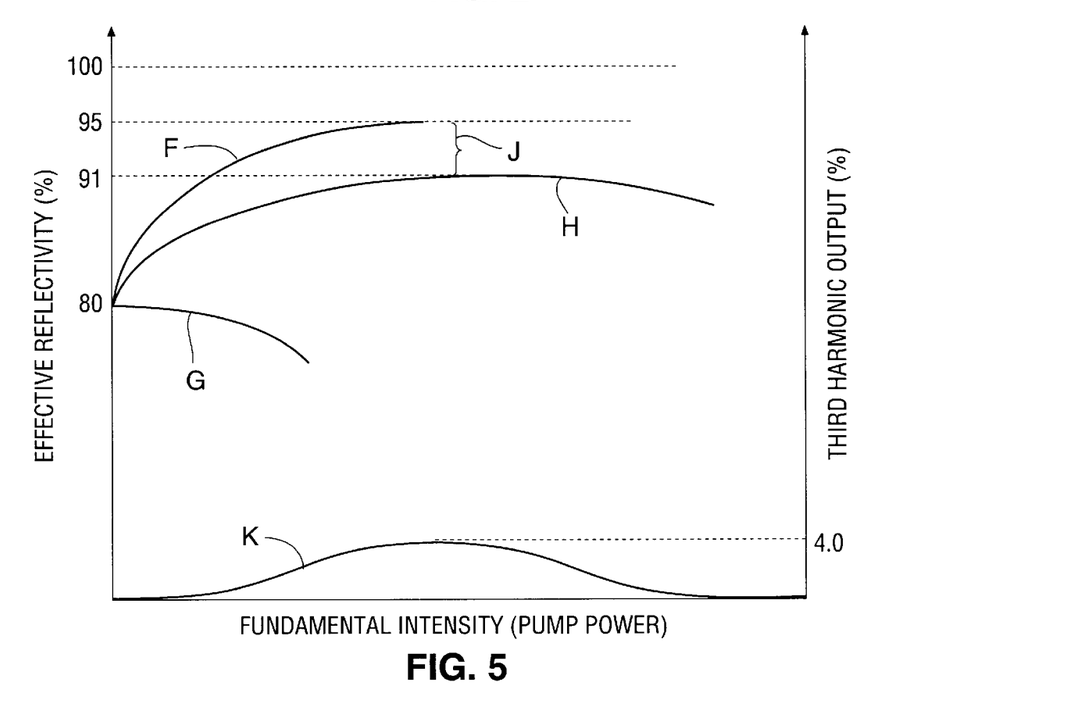
FIG. 5 is a graph schematically illustrating the effect on the effective reflection of the combination of the output coupling mirror and optically-nonlinear crystal of FIG. 4 due to the inclusion of the second optically-nonlinear crystal in the resonator.

If too long a third-harmonic generating crystal is included in the space between mirror and second-harmonic generating crystal, effective reflection can not rise with increasing intensity and modelocking is no longer possible as indicated by curve G. It is, however -possible to select a crystal sufficiently short that modelocking remains effective. This is depicted by curve H which shows the computed effective reflection when optically-nonlinear crystal 60 has a length of 1.5 mm. There is a drop in effective-reflection of about 4% from the value (curve F) without a third-harmonic generating crystal in resonator 22. This corresponds approximately to the amount of third-harmonic power (radiation 3ω) coupled out of resonator 22 as depicted in FIG. 5 by curve H. Curve H also indicates that the available fraction of 1064 nm power coupled out as 355 nm power reaches a peak and then decreases for increasing 1064 nm power.

By way of example, in a numerical evaluation of a laser in accordance with laser 23, resonator 22 was assumed to be configured as described above in the numerical evaluation of laser 20. Optically-nonlinear crystal 60 was assumed to be an LBO crystal having a cross section 3.0 mm×3.0 mn and a length of 1.5 mm. Numerical simulations indicate that a peak 355 power of about 5.0 W may be obtained.

Figure 6:
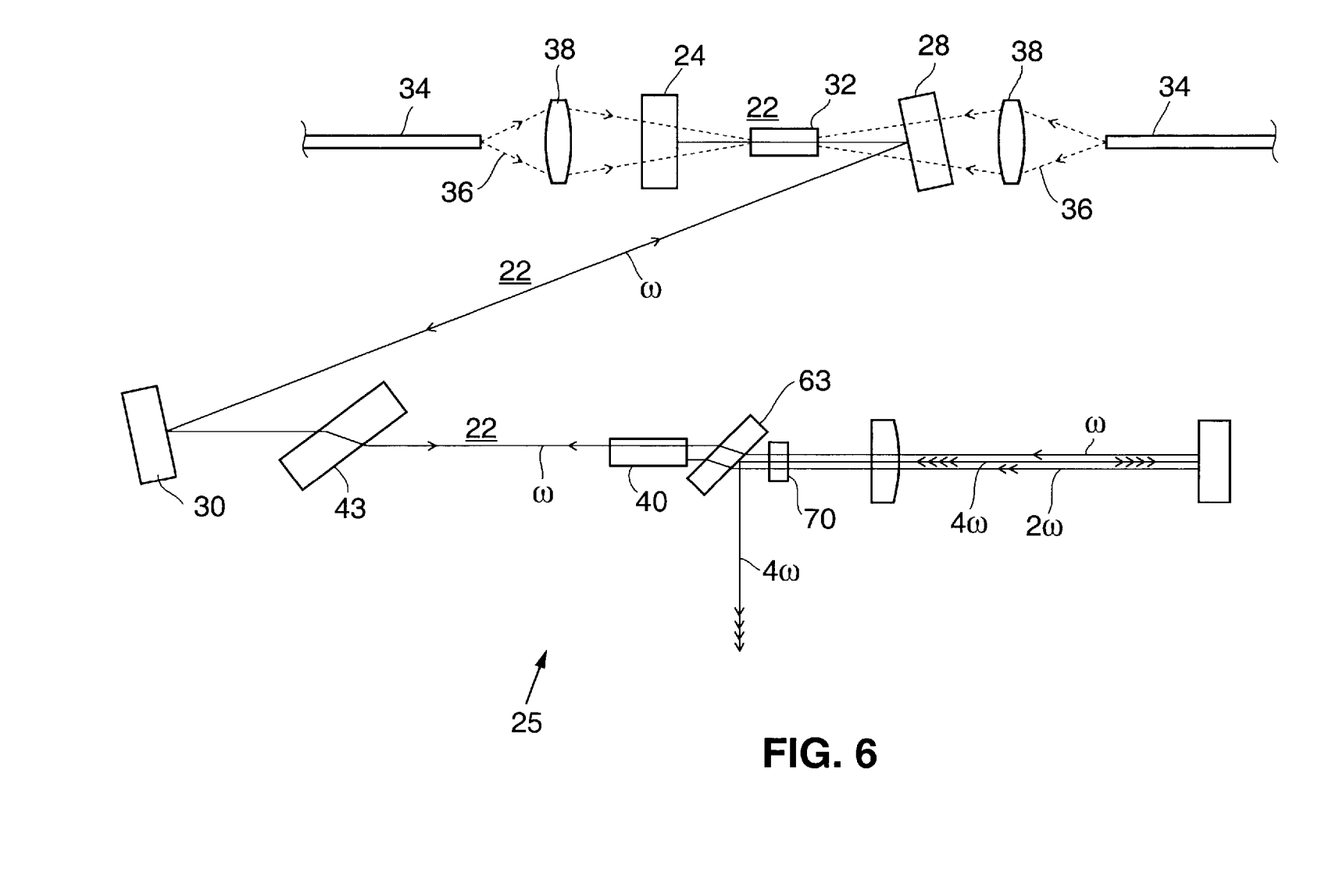
FIG. 6 schematically illustrates still another preferred embodiment of a laser in accordance with the present invention, similar to the laser of FIG. 4 but wherein the second optically-nonlinear crystal located within the resonator is arranged to generate fourth-harmonic radiation from the second harmonic-radiation.

Referring now to FIG. 6, still another embodiment 25 of a modelocked harmonic-generating laser in accordance with the present invention is illustrated. Laser 25 is similar in most respects to laser 23, with an exception that it includes an optically-nonlinear crystal 70 arranged to double the frequency of second-harmonic radiation 2ω thereby providing fourth-harmonic radiation having a frequency 4ω. A mirror 63, which is transparent to fundamental and second-harmonic radiation and reflective for fourth-harmonic radiation directs fourth-harmonic radiation 4ω out of resonator 22. It is estimated that greater than about 1.5 W of 266 nm radiation can be produced if optically-nonlinear crystal 70 is a BBO crystal having a thickness of about 2.0 nm.

Embodiments and examples of the inventive passively modelocked harmonic generating lasers are described above as including relatively long resonators. The long resonators allow, inter alia, a relatively large separation between optically-nonlinear crystal 40 (the second-harmonic generating crystal) and mirror 26 (the output coupling mirror). This long separation, in the case of laser 20 of FIG. 1 allows for a convenient provision of the phase-relationship between fundamental and second-harmonic radiation required for passive modelocking to occur. An alternate approach to providing the required phase relationship is possible by using the output coupling mirror to provide a specific phase relationship between fundamental radiation ω and second-harmonic radiation 2ω. Using the output coupling mirror as a phase shifting element permits a more compact embodiment 27 of the inventive laser. The output coupling mirror, of course must still provide a suitable difference in transmission between the fundamental and second-harmonic as described-above with reference to FIG. 3.

Figure 7:
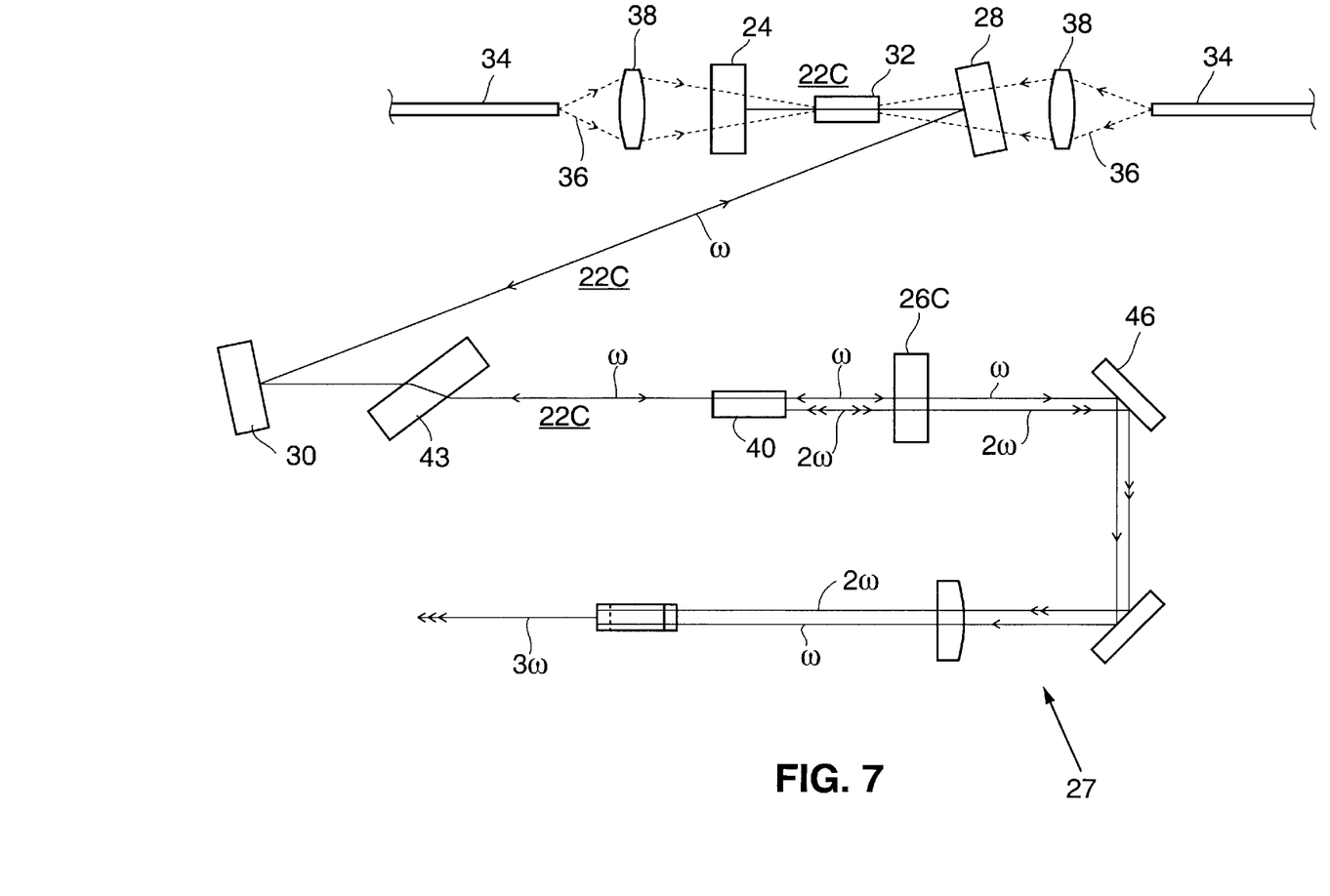
FIG. 7 schematically illustrates a further embodiment of a laser in accordance with the present invention including an output coupling mirror arranged to provide a predetermined phase relationship between fundamental and second-harmonic radiation for facilitating passive modelocking.

Referring now to FIG. 7, an embodiment 27 of a laser in accordance with the present invention includes an output-coupling mirror 26C which provides the above discussed phase relationship. Laser 27 is similar in most respects to laser 20 of FIG. 1 with the exception there are no refractive optical elements between optically-nonlinear crystal 40 (the second-harmonic generating crystal) and output coupling mirror 26 and optically-nonlinear crystal 40 is relatively close to mirror 26C. Mirror 26C provides, on reflection therefrom, a phase relationship P between fundamental radiation 2ω and second-harmonic radiation 2ω given by an equation:

$$P = Arg[\Phi_{2H}] - 2Arg[\Phi_F] = \pm 180° \qquad (1)$$

where $\Phi_F$ and $\Phi_{2H}$ are the phase retardation on reflection of the fundamental and second-harmonic radiations respectively. The phase relationship optimizes back conversion of second harmonic radiation to fundamental radiation by the combination of the mirror and the optically nonlinear crystal. In arriving at a suitable multilayer interference coating design for mirror 26, a problem is presented by the fact that specific fundamental and second-harmonic reflectivities are required in addition to the phase relationship P.

In one particular design example of mirror 26C, the reflectivities of mirror for fundamental and second-harmonic radiation were specified as respectively 80.0 and 92.0 percent with a phase relationship as specified in equation (1). The design problem was complicated by a lack of design software which could optimize a layer structure to an arbitrary phase-difference (between wavelengths) target. The problem was solved as follows.

First a number of basic layer structures which provided about the desired fundamental and second-harmonic reflectivities were investigated, initially without regard to the phase relationship. These structures included combinations of long-pass and short-pass basic layer structures as well as basic layer structures which would provide reflectivity at both fundamental and second harmonic wavelengths. These latter structures were of a type known in the art as two-to-one stacks.

In selected ones of the test structures which came closest to meeting the reflectivity specification, an outer layer was incrementally varied in thickness and the relationship P evaluated at each increment until a value close to the desired 180 degrees was obtained. At that point, the actual values of phase retardation for fundamental and second-harmonic radiation were noted as well as the actual reflectivities.

In each structure so investigated it appeared that the relationship of equation (1) would be satisfied if $\Phi_{2H}$ were zero (or 360°) and $\Phi_F$ were 270°. Accordingly, an initial structure which provided the closest match to the reflectivity specification was selected and computer optimized. The initial structure was:

$$\text{Air}/(0.67L\ 1.33H)^4(0.5L\ 0.5H)^3/\text{Glass} \quad (2)$$

where L and H represent quarter-wave optical thicknesses of respectively silicon dioxide ($SiO_2$) and titanium dioxide ($TiO_2$) at a wavelength of 1064 nm. Reflectivity targets for optimization were set at 80% and 92% percent for fundamental and second-harmonic radiation (1064 nm and 532 nm) respectively. Reflection phase retardation targets were set at 270.00 and 0.0° percent for the fundamental and second-harmonic radiation respectively.

Figure 8:
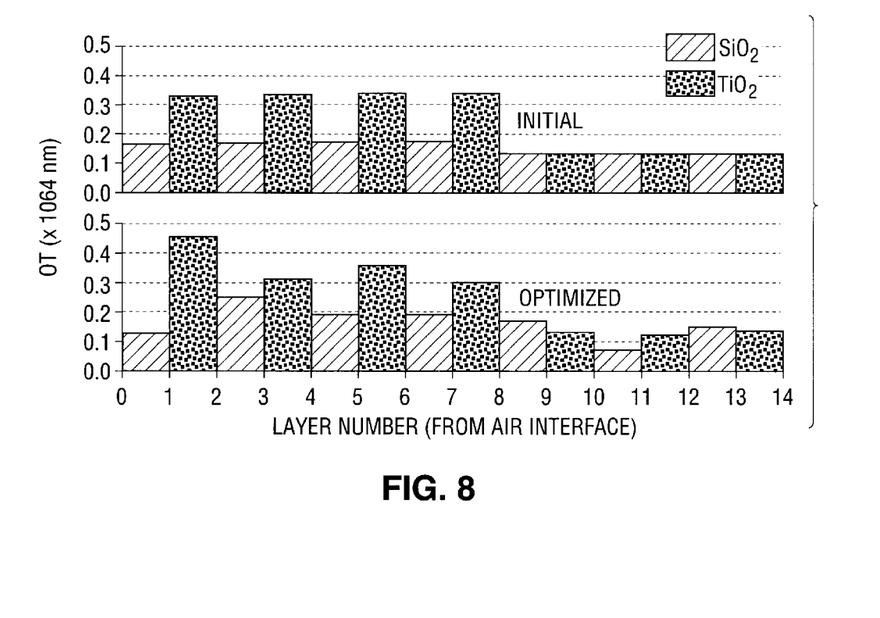
FIG. 8 is a graphical representation of a multilayer interference layer structure before and after-computer optimization for the output coupling mirror of FIG. 7.
Figure 9:
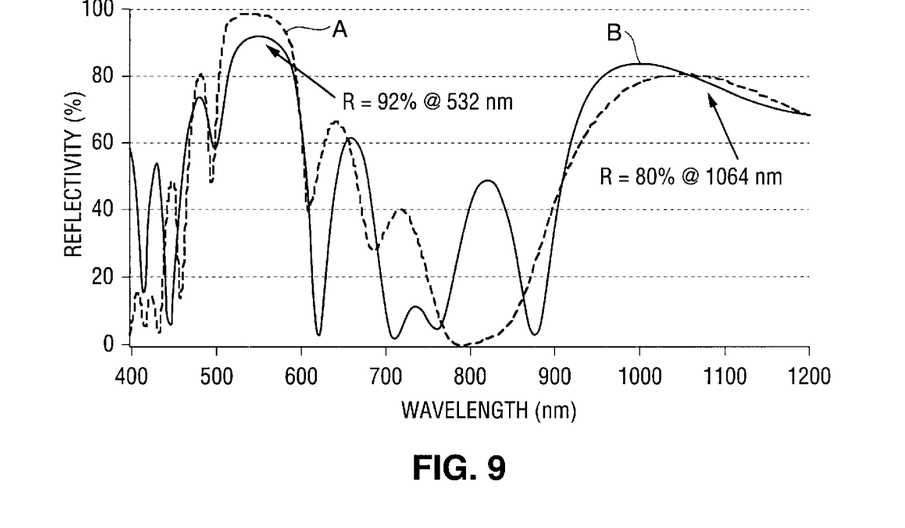
FIG. 9 is a graph schematically illustrating reflection and phase-retardation on reflection as a function of wavelength multilayer interference layer structure of FIG. 8 before and after optimization.
Figure 10:
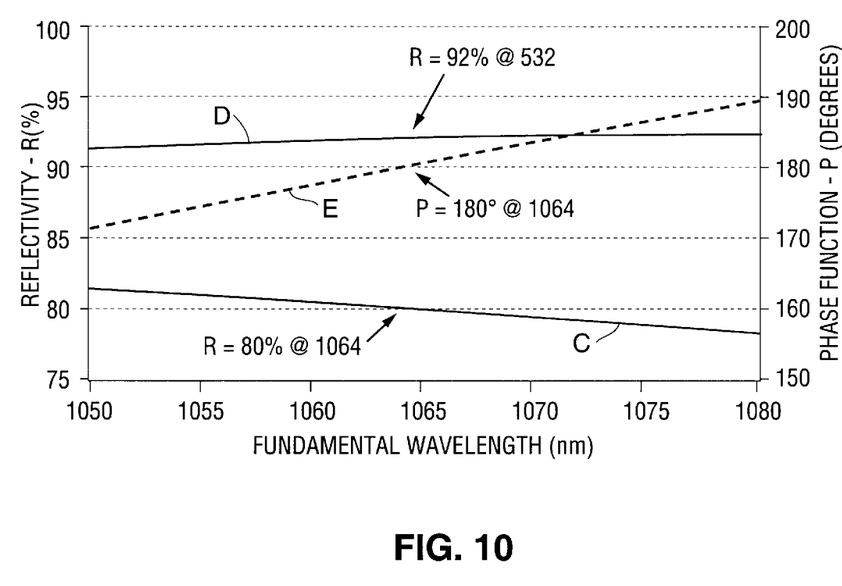
FIG. 10 is a graph schematically illustrating the difference as a function of wavelength of twice the phase-retardation on reflection for the fundamental radiation and the phase-retardation on reflection for the second-harmonic radiation in the optimized multilayer interference layer structure of FIG. 8.

The structure before and after optimization is depicted graphically in FIG. 8. It can be seen that the general form of the initial structure is maintained after the optimization. In FIG. 9, the reflectivity as a function of wavelength before and after optimization are depicted graphically by curves A and B respectively. It can be seen that the general form of the reflectivity as a function of wavelength is also maintained after the optimization. In FIG. 10, for the optimized structure only, the reflectivity as a function of wavelength for corresponding fundamental (curve C) and second harmonic (curve D) wavelengths is graphically depicted together with corresponding values of the phase relationship P (curve E).

The present invention is described above in terms of a preferred and other embodiments. The invention is not limited, however, to those embodiments described and depicted. Rather the invention is limited only by the claims appended hereto.

What is claimed is:

1. A laser, comprising:
    a laser resonator terminated by first and second mirrors;
    a gain-medium located in said laser resonator;
    an optical pump for energizing said-gain medium, thereby causing fundamental radiation having a fundamental frequency to circulate in said laser resonator;
    a first optically-nonlinear element located in said laser resonator between said gain-medium and said first mirror and cooperatively arranged with said first mirror such that a first portion of said fundamental radiation is converted to second-harmonic radiation on traversing said first optically-nonlinear element from said gain-medium to said first mirror and a first portion of said second-harmonic radiation is reflected from said first mirror back into said optically nonlinear element a second portion of said second-harmonic radiation being transmitted out of said laser resonator by said first mirror;
    means being provided between said first optically-nonlinear element and said first mirror for adjusting the phase relationship between said first portion of said reflected second-harmonic radiation and said fundamental radiation such that said reflected first portion of said second-harmonic radiation is reconverted to fundamental radiation by said first optically-nonlinear element, thereby providing passive modelocking of said fundamental radiation, said passive modelocking causing said fundamental radiation to circulate in said resonator as a sequence of pulses; and
    a second optically-nonlinear element located outside of said laser resonator and arranged to convert said transmitted second portion of said second-harmonic radiation to one of third-harmonic radiation or fourth-harmonic radiation.

2. The laser of claim 1, wherein a second portion of said fundamental radiation is transmitted by said first mirror out of said laser resonator and said second optically-nonlinear element is arranged to convert said second portion of said second-harmonic radiation to third-harmonic radiation by mixing it with said second portion of said fundamental radiation.

3. The laser of claim 2, wherein the transmissivity of said first mirror for said fundamental and second-harmonic radiations is arranged such that the power of said transmitted second portions of said fundamental and second-harmonic radiations are within 15 percent of each other.

4. The laser of claim 1, wherein said second optically-nonlinear element is arranged to convert said transmitted second portion of said second-harmonic radiation to fourth-harmonic radiation.

5. A laser, comprising:
    a laser resonator terminated by first and second mirrors;
    a gain-medium located in said laser-resonator;
    an optical pump for energizing said-gain medium, thereby causing fundamental radiation having a fundamental frequency to circulate in said laser resonator;
    a first optically-nonlinear element located in said laser resonator between said gain-medium and said first mirror and cooperatively arranged with said first mirror such that a first portion of said fundamental radiation is converted to second-harmonic radiation on traversing said first optically-nonlinear element from said gain-medium to said first mirror and a first portion of said second-harmonic radiation is reflected from said first mirror back into said optically nonlinear element, means being provided between said first optically-nonlinear element and said first mirror for adjusting the phase relationship between said first portion of said reflected second-harmonic radiation and said fundamental radiation such that said reflected first portion of said second-harmonic radiation is reconverted to fundamental radiation by said first optically-nonlinear element, thereby providing passive modelocking of said fundamental-frequency radiation, said passive modelocking causing said fundamental radiation to circulate in said resonator as a sequence of pulses; and
    a second optically-nonlinear element located in said laser resonator between said first optically-nonlinear element and said first mirror and arranged to convert a second portion of said second-harmonic radiation to third-harmonic radiation by mixing said second portion of said second-harmonic radiation with a second portion of said fundamental radiation.

6. The laser of claim 5, further including a dichroic mirror located between said first and second optically-nonlinear elements and arranged to direct said third-harmonic radiation out of said laser-resonator.

7. The laser of claim 5, wherein said gain-medium is one of Nd:YAG and Nd:YVO$_4$ and said fundamental radiation has a wavelength of about 1064 nanometers.

8. The laser of claim 7, wherein said first optically-nonlinear element is a crystal of LBO.

9. The laser of claim 8, wherein said second optically-nonlinear element is a crystal of LBO.

10. A laser, comprising:

a laser resonator terminated by first and second mirrors;

a gain-medium located in said laser-resonator;

an optical pump for energizing said-gain medium, thereby causing fundamental radiation having a fundamental frequency to circulate in said laser resonator;

a first optically-nonlinear element located in said laser resonator between said gain-medium and said first mirror and cooperatively arranged with said first mirror such that a first portion of said fundamental radiation is converted to second-harmonic radiation on traversing said first optically-nonlinear element from said gain-medium to said first mirror and a first portion of said second-harmonic radiation is reflected from said first mirror back into said optically nonlinear element, means being provided between said first optically-nonlinear element and said first mirror for adjusting the phase relationship between said first portion of said reflected second-harmonic radiation and said fundamental radiation such that said reflected first portion of said second-harmonic radiation is reconverted to fundamental radiation by said first optically-nonlinear element, thereby providing passive modelocking of said fundamental-frequency radiation, said passive modelocking causing said fundamental radiation to circulate in said resonator as a sequence of pulses; and a second optically-nonlinear element located in said laser resonator between said first optically-nonlinear element and said first mirror and arranged to double the frequency of a second portion of said second-harmonic radiation thereby generating fourth-harmonic radiation.

11. The laser of claim 10, further including a dichroic mirror located between said first and second optically-nonlinear elements and arranged to direct said fourth-harmonic radiation out of said laser-resonator.

12. The laser of claim 10, wherein said gain-medium is one of Nd:YAG and Nd:YVO$_4$ and said fundamental radiation has a wavelength of about 1064 nanometers.

13. The laser of claim 12 wherein said first optically-nonlinear element is a crystal of LBO.

14. The laser of claim 13 wherein said second optically-nonlinear element is a crystal of BBO.

15. A laser, comprising:

laser resonator terminated by first and second mirrors;

a gain-medium located in said laser-resonator;

an optical pump for energizing said-gain medium, thereby causing fundamental radiation having a fundamental frequency to circulate in said laser resonator;

a first optically-nonlinear element located in said laser resonator between said gain-medium and said first mirror and cooperatively arranged with said first mirror such that a first portion of said fundamental radiation is converted to second-harmonic radiation on traversing said first optically-nonlinear element from said gain-medium to said first mirror and a first portion of said second-harmonic radiation is reflected from said first mirror back into said optically nonlinear element, means being provided for adjusting the phase relationship between said first portion of said reflected second-harmonic radiation and said fundamental radiation such that said reflected first portion of said second harmonic radiation is reconverted to fundamental radiation by said first optically-nonlinear element, thereby providing passive modelocking of said fundamental-frequency radiation, said passive modelocking causing said fundamental radiation to circulate in said resonator as a sequence of pulses;

said first mirror arranged to transmit a second portion of said fundamental radiation and a second portion of said second-harmonic radiation out of said laser-resonator; and a second optically-nonlinear element located outside said laser-resonator and arranged to convert said transmitted second portions of said fundamental and second-harmonic radiation into third-harmonic radiation.

16. The laser of claim 15, wherein the average power of said transmitted second portions of said fundamental and second-harmonic radiation are within 15 percent of each other.

17. A laser, comprising:

a laser resonator terminated by first and second mirrors;

a gain-medium located in said laser-resonator;

an optical pump for energizing said-gain medium, thereby causing fundamental radiation having a fundamental frequency to circulate in said laser resonator;

a first optically-nonlinear element located in said laser resonator between said gain-medium and said first mirror and cooperatively arranged with said first mirror such that a first portion of said fundamental radiation is converted to second-harmonic radiation on traversing said first optically-nonlinear element from said gain-medium to said first mirror and a first portion of said second-harmonic radiation is reflected from said first mirror back into said optically nonlinear element, means being provided between said first optically-nonlinear element and said first mirror for adjusting the phase relationship between said first portion of said reflected second-harmonic radiation and said fundamental radiation such that said reflected first portion of said second-harmonic radiation is reconverted to fundamental radiation by said first optically-nonlinear element, thereby providing passive modelocking of said fundamental-frequency radiation, said passive modelocking causing said fundamental radiation to circulate in said resonator as a sequence of pulses;

said first mirror arranged to transmit a second portion of said fundamental radiation and a second portion of said second-harmonic radiation out of said laser-resonator; and a second optically-nonlinear element located outside said laser-resonator and arranged to double the frequency of said transmitted second portion of said second-harmonic radiation, thereby generating fourth-harmonic radiation.

18. A laser, comprising:

a laser resonator terminated by first and second mirrors;

a gain-medium located in said laser-resonator;

an optical pump for energizing said-gain medium, thereby causing fundamental radiation having a fundamental frequency to circulate in said laser resonator;

a first optically-nonlinear element located in said laser resonator proximate said first mirror said optically nonlinear crystal arranged to convert a portion of said fundamental radiation passing therethrough toward said first mirror into second-harmonic radiation whereby fundamental radiation and second-harmonic radiation are incident on said first mirror and reflected therefrom back into said optically-nonlinear element;

said first mirror arranged such that a portion of said second-harmonic radiation incident thereon is transmitted therethrough and configured to provide a predetermined phase-relationship between said fundamental and second-harmonic radiation reflected therefrom, said phase-relationship is such that said reflected second-harmonic radiation is converted back into fundamental radiation by said optically-nonlinear element whereby said fundamental radiation circulating in said laser resonator is passively-modelocked, said passive modelocking causing said fundamental radiation to circulate in said resonator as a sequence of pulses; and wherein a second optically-nonlinear element is located outside of said laser resonator and arranged to convert said transmitted portion of said second-harmonic radiation to one of third-harmonic radiation or fourth-harmonic radiation.

19. The laser of claim 18 wherein said first mirror is further arranged to transmit a portion of said fundamental radiation incident thereon and said second optically-nonlinear element is arranged to generate third-harmonic radiation from said transmitted fundamental and second-harmonic radiation.

20. The laser of claim 18 wherein said second optically-nonlinear element is arranged to generate fourth-harmonic radiation from said transmitted second-harmonic radiation.

* * * * *